(12) United States Patent
Akiyama

(10) Patent No.: US 8,435,325 B2
(45) Date of Patent: May 7, 2013

(54) METHOD AND DEVICE FOR REMOVING $CO_2$ AND $H_2S$

(75) Inventor: Tomoko Akiyama, Hitachinaka (JP)

(73) Assignee: Hitachi, Ltd., Tokyo (JP)

(\*) Notice: Subject to any disclaimer, the term of this patent is extended or adjusted under 35 U.S.C. 154(b) by 408 days.

(21) Appl. No.: 12/581,725

(22) Filed: Oct. 19, 2009

(65) Prior Publication Data

US 2010/0101416 A1 Apr. 29, 2010

(30) Foreign Application Priority Data

Oct. 23, 2008 (JP) ................................. 2008-273292

(51) Int. Cl.
*B01D 53/14* (2006.01)
(52) U.S. Cl.
USPC ........ 95/16; 95/161; 95/163; 95/173; 95/174; 95/181; 95/183; 95/199; 95/223; 95/235; 95/236
(58) Field of Classification Search .................. None
See application file for complete search history.

(56) References Cited

U.S. PATENT DOCUMENTS

| | | | |
|---|---|---|---|
| 3,531,917 A | 10/1970 | Grünewald et al. | |
| 3,609,942 A * | 10/1971 | Alleman | 95/192 |
| 3,664,091 A * | 5/1972 | Hegwer | 95/161 |
| 4,106,916 A * | 8/1978 | Tuckett et al. | 95/21 |
| 4,330,305 A | 5/1982 | Kuessner et al. | |
| 4,405,584 A * | 9/1983 | Foroulis | 423/228 |
| 4,553,984 A | 11/1985 | Volkamer et al. | |
| 4,714,480 A * | 12/1987 | Wansink | 95/174 |
| 6,071,484 A * | 6/2000 | Dingman et al. | 423/229 |
| 2002/0104438 A1 | 8/2002 | Cadours et al. | |
| 2004/0226441 A1* | 11/2004 | Palmer | 95/235 |
| 2006/0156923 A1 | 7/2006 | Meckl et al. | |
| 2008/0107581 A1* | 5/2008 | Sparling et al. | 423/222 |
| 2008/0210092 A1* | 9/2008 | Buckles et al. | 95/204 |
| 2009/0241773 A1* | 10/2009 | Lechnick et al. | 95/44 |
| 2010/0005722 A1* | 1/2010 | Iijima et al. | 48/128 |

FOREIGN PATENT DOCUMENTS

| | | |
|---|---|---|
| FR | 2 897 785 A1 | 8/2007 |
| JP | 52-114589 | 9/1977 |
| JP | 52-114590 | 9/1977 |
| JP | 52-125502 A | 10/1977 |
| JP | 3-245822 A | 11/1991 |
| JP | 7-258665 A | 10/1995 |
| JP | 2824387 B2 | 10/1995 |
| JP | 10-249133 A | 9/1998 |
| JP | 2004-331701 A | 11/2004 |
| JP | 2005-139225 A | 6/2005 |

(Continued)

OTHER PUBLICATIONS

Dave Holbrook, "Syngas Treating for Stringent Product Specifications and $Co_2$ Capture", 2007 Gasification Technologies Conference, San Frisco, Oct. 14-17, 2007, (Three (3) pages).

(Continued)

*Primary Examiner* — Duane Smith
*Assistant Examiner* — Pankti Patel
(74) *Attorney, Agent, or Firm* — Crowell & Moring LLP

(57) ABSTRACT

Disclosed are methods for recovering $CO_2$ and $H_2S$ from a feed gas including at least $CO_2$ and $H_2S$.

2 Claims, 9 Drawing Sheets

FOREIGN PATENT DOCUMENTS

| | | |
|---|---|---|
| JP | 2005-296897 A | 10/2005 |
| JP | 2006-150298 A | 6/2006 |
| JP | 2006-167520 A | 6/2006 |
| JP | 2006-526496 A | 11/2006 |
| JP | 2007-702 A | 1/2007 |
| JP | 2007-325996 A | 12/2007 |
| JP | 2008-307519 A | 12/2008 |
| JP | 2008-307520 A | 12/2008 |
| WO | WO 2006/107026 A1 | 10/2006 |
| WO | WO 2008/097839 A1 | 8/2008 |
| WO | WO 2008/103467 A1 | 8/2008 |

OTHER PUBLICATIONS

European Search Report dated Mar. 23, 2012 (six (6) pages).
European Search Opinion dated Jun. 8, 2012 (five (5) pages).

* cited by examiner

METHOD AND DEVICE FOR REMOVING $CO_2$ AND $H_2S$

CLAIM OF PRIORITY

The present application claims priority from Japanese Patent Application JP 2008-273292 filed on Oct. 23, 2008, the content of which is hereby incorporated by reference into this application.

FIELD OF THE INVENTION

The present invention relates to a method and a device for removing $CO_2$ and $H_2S$ at the same time from a variety of fuel gases including $CO_2$ and $H_2S$.

BACKGROUND OF THE INVENTION

In order to suppress global warming, utilization of natural gas having less amount of $CO_2$ generation while combusting compared with other fossil fuels is considered to increase from now on. Natural gas produced from strata includes acidic materials such as $CO_2$ and $H_2S$. $CO_2$ and $H_2S$ have to be removed before liquefaction because $CO_2$ solidifies in the process of liquefaction and causes clogging of pipelines and a heat exchanger and $H_2S$ induces corrosion of installations such as pipelines. Other than the natural gas, coal seam gas, gas gasified from heavy oil, and gas gasified from oil coke and coal show the same problem as above.

As a method of removing $CO_2$ and $H_2S$ from these gases, a method is disclosed in which feed gas including $CO_2$ and $H_2S$ and water solution of N-methyl diethanolamine are contacted under conditions of from 10 to 100 bars and from 40 to 100° C. (For example, see U.S. Pat. No. 4,553,984).

As another method, a method is disclosed in which feed gas including $CO_2$ and $H_2S$ is removed by making use of water solution of hindered amine selected from monosubalkylamino subalkanol as rich solution (For example, see Japanese Patent No. 2824387).

Not only in natural gas but also in coal seam gas and gas gasified from heavy oil that can be processed according to the present invention, concentration of $CO_2$ is usually higher than the that of $H_2S$ by the order of from 10 to 1000 times. $H_2S$ primarily dissolves in advance in rich solution in the regions from a down stage to a middle stage of an absorber and is removed. It has become clear that such phenomenon occurs that the property of the rich solution changes and $H_2S$ that has already dissolved therein is released again in association with absorption of $CO_2$ having extremely higher concentration than that of $H_2S$ after the above-mentioned dissolution and removal of $H_2S$. For this reason, in order to decrease the property change of the rich solution in association with absorption of $CO_2$ having high concentration, an excess amount of rich solution has to be circulated, causing a problem that an amount of energy to be consumed for regenerating the rich solution is increased. In order to avoid such problem, a method is known in which the pressure of the rich solution that has absorbed $CO_2$ and $H_2S$ is lowered and the rich solution is regenerated by releasing the absorbed $CO_2$ and $H_2S$. Unfortunately, this method has a disadvantage that a predetermined performance cannot be obtained at the time of absorption since the concentration of $CO_2$ and $H_2S$ remaining in the regenerated rich solution is high.

An object of the present invention is to provide a method and a device for removing acidic materials, such as $CO_2$ and $H_2S$, in a gas purifying process by contacting gas including $CO_2$ and $H_2S$, such as natural gas, coal seam gas, and gas gasified from heavy oil, with rich solution. The method and the device can reduce the regeneration energy for the rich solution and obtain a treated gas having substantially no $H_2S$ concentration.

SUMMARY OF THE INVENTION

The present invention provides a method for removing $CO_2$ and $H_2S$ from a feed gas including at least $CO_2$ and $H_2S$. The method comprises a step of introducing the feed gas into a first absorber, and removing $CO_2$ and $H_2S$ from the feed gas by contacting the feed gas with a lean solution in the first absorber; and a step of subsequently introducing the feed gas into a second absorber, and further removing $CO_2$ and $H_2S$ remaining in the feed gas by contacting the feed gas with a semi-lean solution in the second absorber. A rich solution composed of the lean solution and the semi-lean solution that have absorbed $CO_2$ and $H_2S$ in the first absorber and in the second absorber respectively is introduced into a flash drum in which an internal pressure is kept lower than that in the first absorber and in the second absorber. After a part of $CO_2$ and $H_2S$ is released from the rich solution and a semi-lean solution is obtained in the flash drum, a part of the semi-lean solution in the flash drum is cooled and introduced into the second absorber to contact again with the feed gas in the second absorber. A remaining part of the semi-lean solution in the flash drum is introduced into a stripper and heated to release remaining $CO_2$ and $H_2S$ from the rich solution and a lean solution is obtained in the stripper. A part of the lean solution in the stripper is cooled and introduced into the first absorber to contact again with the feed gas in the first absorber. After a remaining part of the lean solution in the stripper is cooled, the remaining part of the lean solution is introduced into the second absorber from a upper level than a level of where the semi-lean solution from which a part of $CO_2$ and $H_2S$ has been released in the flash drum is introduced, and again is contacted with the feed gas in the second absorber, and thereby obtaining treated gas.

The present invention also provides a method for removing $CO_2$ and $H_2S$ from a feed gas including at least $CO_2$ and $H_2S$. The method comprises a step of introducing the feed gas into a first absorber, and removing $CO_2$ and $H_2S$ from the feed gas by contacting the feed gas with a lean solution in the first absorber; and a step of subsequently introducing the feed gas into a second absorber, further removing $CO_2$ and $H_2S$ remaining in the feed gas by contacting the feed gas with a semi-lean solution in the second absorber, thereafter introducing the feed gas into a third absorber, and further removing $CO_2$ and $H_2S$ remaining in the feed gas by contacting the feed gas with a lean solution in the third absorber. A rich solution composed of the lean solution and the semi-lean solution that have absorbed $CO_2$ and $H_2S$ in the first absorber and in the second absorber respectively is introduced into a flash drum in which an internal pressure is kept lower than that in the first absorber, in the second absorber, and in the third absorber. After a part of $CO_2$ and $H_2S$ is released from the rich solution and a semi-lean solution is obtained in the flash drum, a part of the semi-lean solution in the flash drum is cooled together with the lean solution that has absorbed $CO_2$ and $H_2S$ in the third absorber and introduced together into the second absorber to contact with the feed gas in the second absorber. A remaining part of the semi-lean solution in the flash drum is introduced into a stripper and heated to release remaining $CO_2$ and $H_2S$ from the rich solution and a lean solution is obtained in the stripper. A part of the lean solution in the stripper is cooled and introduced into the first absorber to contact with the feed gas in the first absorber.

After a remaining part of the lean solution in the stripper is cooled, the remaining part of the lean solution is introduced into the third absorber and is contacted with the feed gas in the third absorber, and thereby obtaining treated gas.

Preferably, the gas including $CO_2$ and $H_2S$ released from the rich solution in the flash drum and in the stripper is contacted with an adsorbent including at least oxides of titanium and molybdenum to adsorb and remove $H_2S$ in the released gas in a form of sulfide. Successively, a gas including oxygen is introduced into the adsorbent to convert sulfur adsorbed in the adsorbent into a sulfur dioxide gas and to regenerate the adsorbent. An exhaust gas including the sulfur dioxide generated by the regeneration is contacted with $CaCO_3$ slurry to fix the sulfur dioxide in a form of $CaSo_4$ and to separate the sulfur dioxide from the gas.

In the above method, $CO_2$ concentration and $H_2S$ concentration in the treated gas are measured. If the measured $CO_2$ concentration or $H_2S$ concentration in the treated gas exceeds a predetermined concentration, an amount of the rich solution to be introduced from the flash drum into the stripper is increased and at the same time an amount of steam to be introduced into a reboiler in the stripper is increased to thereby heighten a rate of the rich solution having been regenerated. Otherwise, the releasing of $CO_2$ and $H_2S$ from the rich solution is accelerated by reducing the pressure in the flash drum to thereby lower the concentration of $CO_2$ and $H_2S$ in the rich solution.

According to the present invention, an installation for removing $CO_2$ and $H_2S$ from the feed gas, such as natural gas and coal seam gas, by contacting the feed gas with rich solution, can reduce an amount of the rich solution to be circulated and, at the same time, can also reduce the regeneration energy for the rich solution.

DESCRIPTION OF THE PREFERRED EMBODIMENTS

Gases to be processed according to the present invention include a variety of gases that includes at least $CO_2$ and $H_2S$ as acidic materials and of which $H_2S$ concentration is low in comparison with $CO_2$ concentration. Examples of such gases include natural gas and coal seam gas.

Herein below, embodiments of the present invention will be explained, however, the present invention is not limited to the embodiments as follows.

First Embodiment

Figure 1:
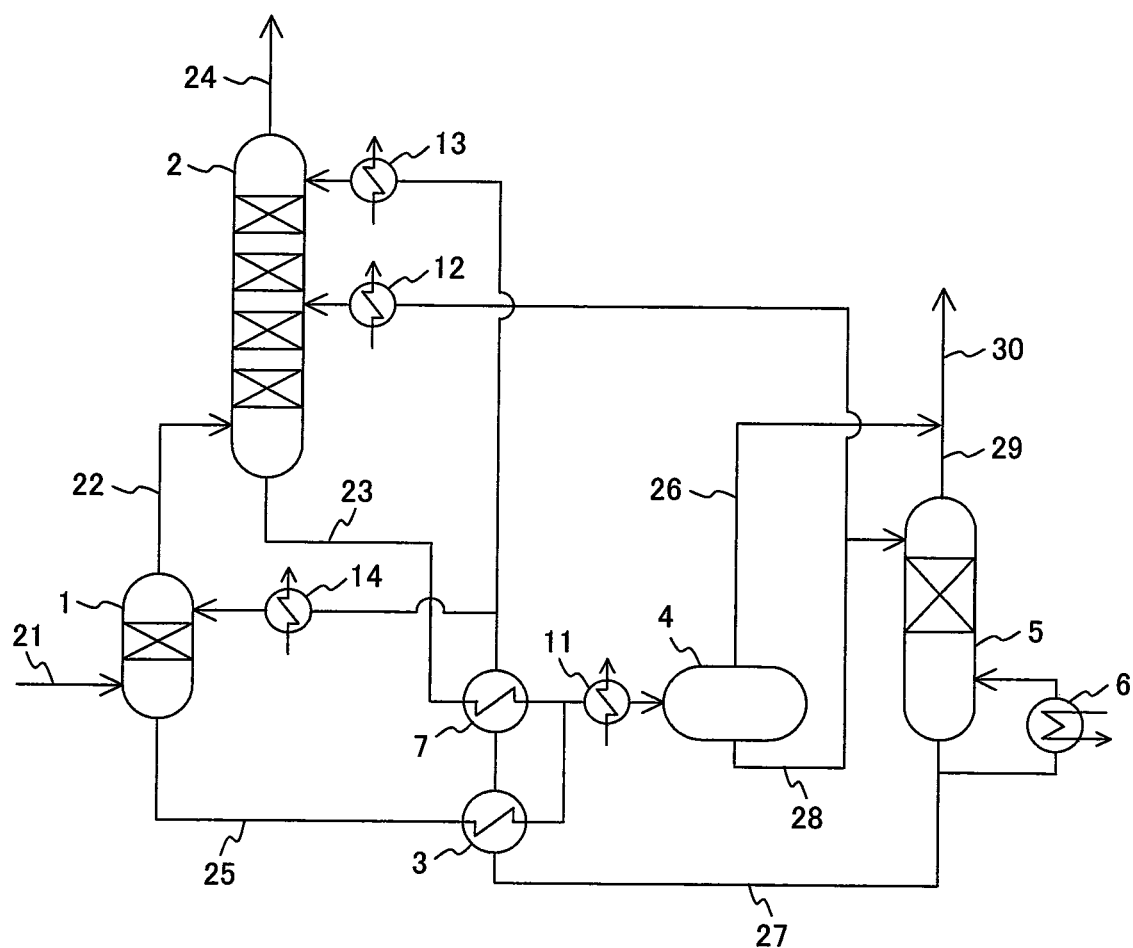
FIG. 1 is a block diagram showing a device for removing acidic materials according to a first embodiment of the present invention.

A first embodiment of the present invention will be explained with reference to FIG. 1. FIG. 1 is a block diagram of a device for removing acidic materials in the present embodiment. The present embodiment shows an example in which the present invention is applied to an installation for natural gas purification.

Natural gas 21 representing feed gas, to which necessary preprocessing and temperature adjustment have been effected beforehand, is supplied to a pre-absorber (first absorber) 1. The feed gas 21 is contacted in a manner of countercurrent with lean solution 27 supplied from a top of the pre-absorber 1, the acidic materials, such as $CO_2$ and $H_2S$, included in the feed gas 21 being absorbed there, and pre-treated gas 22 is exhausted from the top of the pre-absorber 1. On the other hand, rich solution 25 exhausted from a bottom is introduced into a lean/rich exchanger 3 and is heated through heat exchanging with the lean solution 27 introduced into the lean/rich exchanger 3. Because of having passed through the lean/rich exchanger 3, the rich solution 25 is heated to a temperature of higher by 10 to 50° C. than the temperature at the outlet of the pre-absorber 1. If necessary, the rich solution 25 is heated to a further high temperature level by a rich solution heater 11. By means of heating the rich solution 25, since a part of $CO_2$ absorbed in the rich solution 25 is released, the rich solution 25 becomes as a whole in a state of mixed phases of gas and liquid. Such primary rich solution 25 in the state of mixed phases is introduced into a flash drum 4 in which an internal pressure is set lower than that in the pre-absorber 1, and a part of $CO_2$ and $H_2S$, which has been absorbed in the rich solution 25, is released and exhausted as mixed stripped gas 26. The more the pressure in the flash drum 4 is lowered than the pressure in the pre-absorber 1, the more a diffusion amount of $CO_2$ and $H_2S$ increases. On the other hand, if it is required to liquefy the released $CO_2$ at a post stage, power necessary for the liquefaction increases. When the rich solution is preheated beforehand by making use of waste heat in the lean/rich exchangers 3 or the rich solution heater 11, the gas diffuses easily and the pressure in the flash drum 4 can be set comparatively higher, as a result, energy consumed in the entire system can be reduced.

A part of semi-lean solution 28 after releasing a part of absorbed $CO_2$ and $H_2S$ in the flash drum 4 is cooled in a lean solution cooler 12, and thereafter is introduced into an absorber (second absorber) 2 from a middle stage of the absorber 2. On the other hand, the remaining semi-lean solution 28 that is not introduced into the primary absorber 2 is introduced into a stripper 5, heated by a reboiler 6 to release almost all remaining $CO_2$ and $H_2S$, and lean solution 27 is obtained. A part of the lean solution 27 is cooled when passing through the lean/rich exchangers 3 and 7, and after being further cooled to a predetermined temperature by a lean solution cooler 13, is introduced into the absorber 2 from the top. On the other hand, the remaining part of the lean solution 27 is cooled by a lean solution cooler 14 and introduced into the pre-absorber 1 from the top. As in the manner above, by contacting the pre-treated gas 22 with the lean solution 27 including substantially no $H_2S$ in the top portion of the absorber 2, $H_2S$ concentration in treated gas is reduced below 5 ppm and $H_2S$ can be removed down to a level that satisfies a specification for the flow in pipelines. Further, since the lean solution 27 having absorbed $H_2S$ included in the feed gas 21 is immediately exhausted from the bottom, re-releasing of $H_2S$ is suppressed. As a result, the recirculating amount of the rich solution can be reduced.

The pre-treated gas 22 supplied to the absorber 2 is contacted in a manner of countercurrent with the semi-lean solution 28 in a lower layer from a supply port of the semi-lean solution 28 as well as is contacted in countercurrent with the lean solution 27 in an upper layer from the supply port of the semi-lean solution 28, thereby, the acidic materials, such as $CO_2$ and $H_2S$, included in the pre-treated gas 22 are absorbed and resulting gas is exhausted from the top of the absorber 2 as purified gas 24. On the other hand, the semi-lean solution 28 and the lean solution 27 are exhausted from the bottom of the absorber 2 as rich solution 23 that is heated through heat exchanging with the lean solution 27 in the lean/rich exchanger 7 and, if necessary, is further heated by the rich solution heater 11 and then introduced into the flash drum 4. In this heating process, the rich solution 23 becomes in a state of mixed phases of gas and liquid.

Stripped gas 29 including of $CO_2$ and $H_2S$ released from the semi-lean solution 28 in the stripper 5 merges with the stripped gas 26 to form stripped gas 30, which is introduced into an oxidation process of $H_2S$.

Second Embodiment

Figure 2:
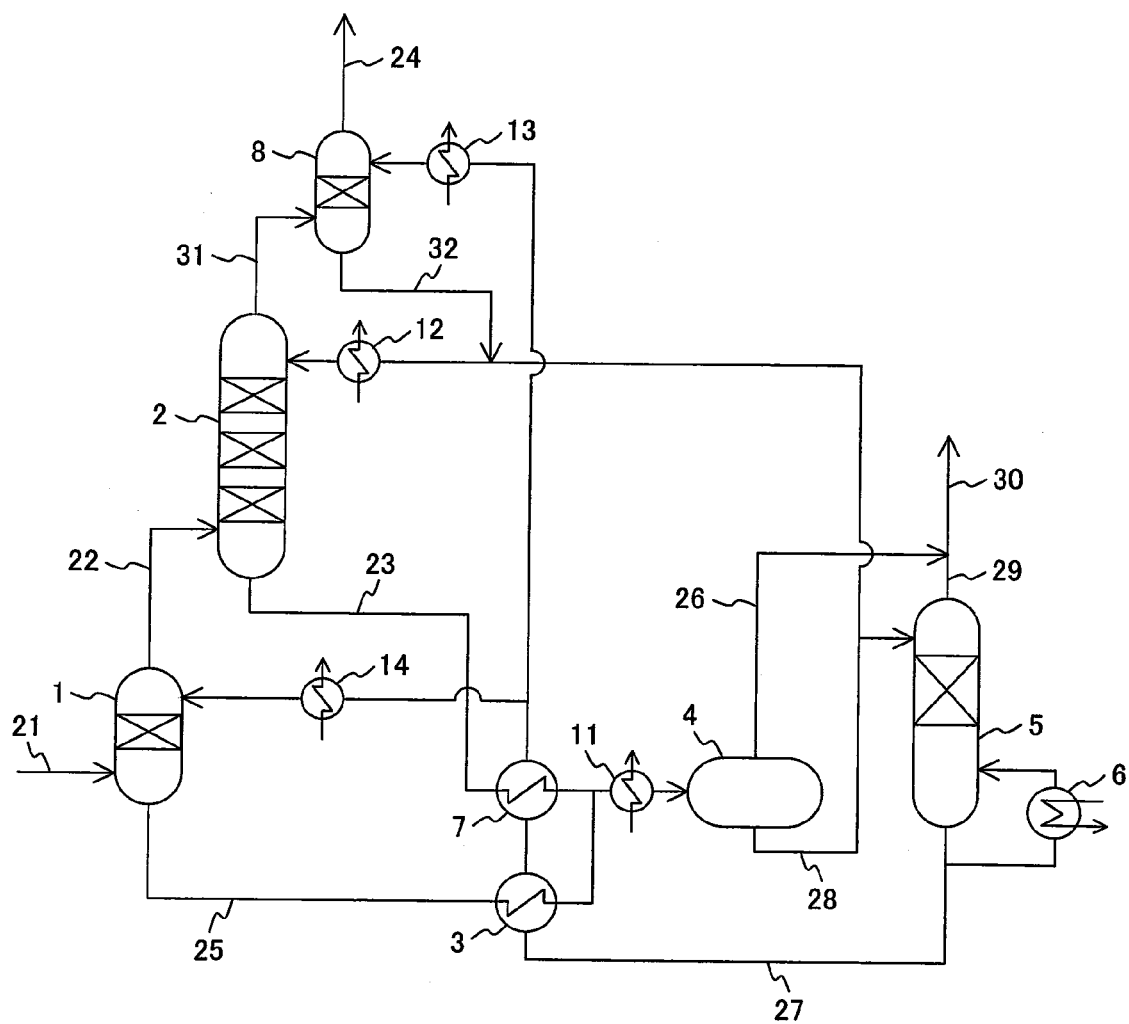
FIG. 2 is a block diagram showing a device for removing acidic materials according to a second embodiment of the present invention.

A second embodiment of the present invention will be explained with reference to FIG. 2. FIG. 2 is a block diagram of a device for removing acidic materials in the present embodiment. The present embodiment shows an example in which a secondary absorber (third absorber) 8 is added at a post stage of the absorber 2 in the first embodiment. Only different portions from the first embodiment will be explained.

The pre-treated gas 22, which is obtained after a part of $CO_2$ and $H_2S$ included in the feed gas 21 is absorbed in the pre-absorber 1, is contacted in a manner of countercurrent with the semi-lean solution 28 supplied from the top portion of the absorber 2 in the filling portion of the absorber 2, thereby, a part of the acidic materials, such as $CO_2$ and $H_2S$, included in the pre-treated gas 22 is absorbed, and treated gas 31 is exhausted from the top portion. The treated gas 31 is contacted in countercurrent with the lean solution 27 supplied from the top portion of the secondary absorber 8 thereby, almost all of $CO_2$ and $H_2S$ remaining in the treated gas 31 is absorbed, and the purified gas 24 including substantially no $H_2S$ is obtained from the top portion.

On the other hand, rich solution 32 exhausted from the bottom of the secondary absorber 8 merges with the semi-lean solution 28, cooled together in the lean solution cooler 12 to a predetermined temperature, thereafter, is introduced into the absorber 2. By cooling the rich solution introduced into the absorber 2 in such manner, an absorbing capacity is increased. As a result, the circulation amount of the rich solution can be reduced.

Third Embodiment

Figure 3:
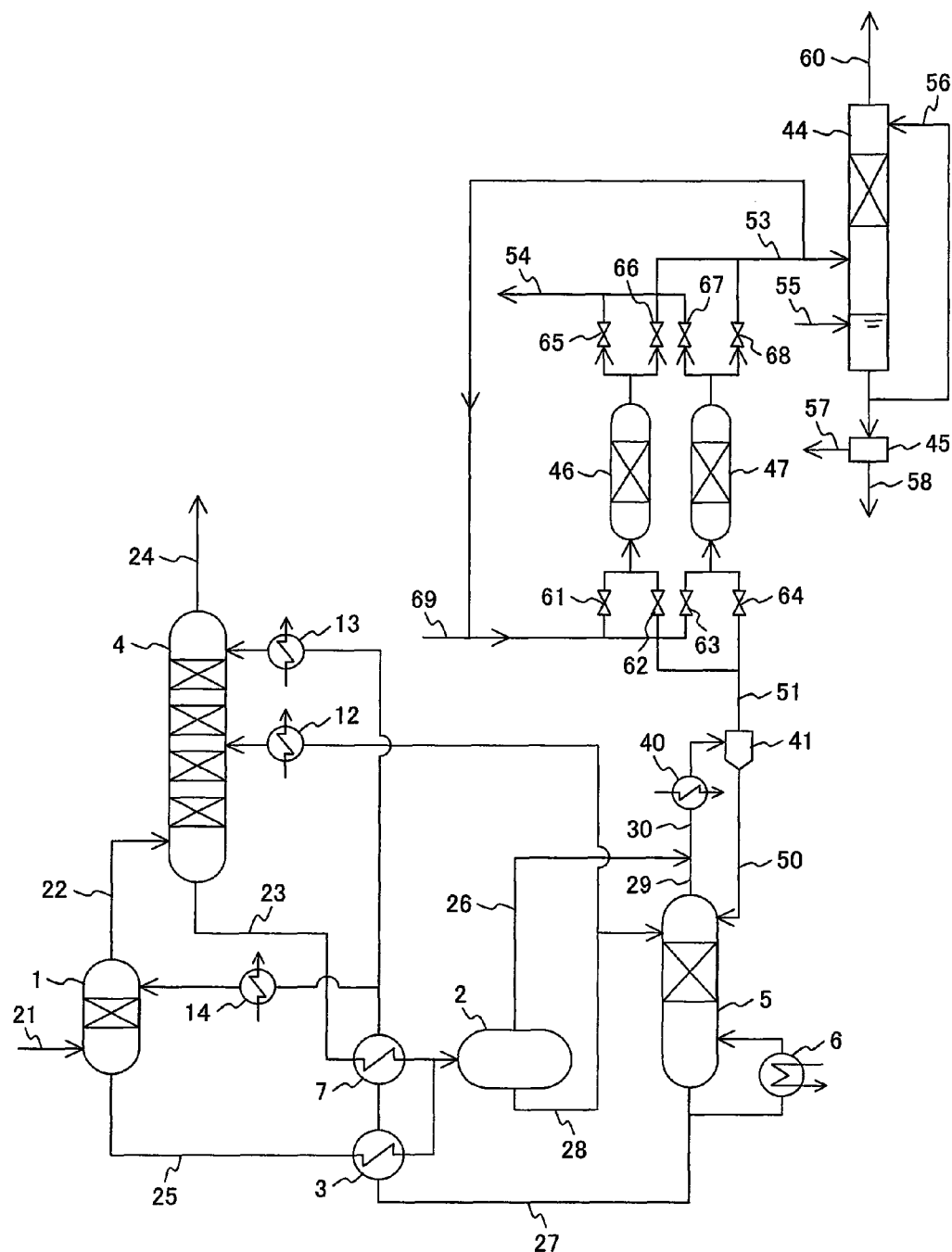
FIG. 3 is a block diagram showing a device for removing acidic materials according to a third embodiment of the present invention.

A third embodiment of the present invention will be explained with reference to FIG. 3. FIG. 3 is a block diagram of a device for removing acidic materials in the present embodiment. The present embodiment shows an example in which $H_2S$ included in the stripped gas 30 released from the rich solution in the flash drum and the stripper is removed by making use of an adsorbent and highly purified $CO_2$ is recovered. Only different portions from the first embodiment will be explained.

After being cooled in a cooler 40, the stripped gas 30 including $CO_2$ and $H_2S$ is introduced into a knock-out drum 41 where water 50 is removed and stripped gas 51 having lowered water concentration is obtained. The stripped gas 51 is introduced through a valve 62 to a catalytic adsorber 46. In the catalytic adsorber 46, an adsorbent is filled having features to adsorb $H_2S$ at a low temperature of 100 to 300° C., and thereafter, to convert the adsorbed sulfur into sulfur dioxide when gas including oxygen is supplied under a temperature of 100 to 600° C., regenerating itself (For example, see Japanese Patent Application Laid-Open Publication No. 52-114589 and No. 52-114590). Accordingly, sulfur in $H_2S$ included in the stripped gas 51 is adsorbed, and $CO_2$ gas including substantially no $H_2S$ is obtained through a valve 65. At this time, valves 61, 64, 66 and 67 are closed.

On the other hand, gas of which oxygen concentration is adjusted to a predetermined level by mixing air 69 to a part of regenerated gas 53 is supplied to another catalytic adsorber 47 via a valve 63. A sulfur component adsorbed in the adsorbent is oxidized to produce sulfur dioxide, and the gas is exhausted via a valve 68 as the regenerated gas 53. A part of the regenerated gas 53 is mixed with air 69 as has been explained above and is supplied to the catalytic adsorber 47 under regeneration. The remaining part of the regenerated gas 53 is introduced into desulfurization equipment 44. In the desulfurization equipment 44, $CaCO_3$ slurry 55 circulates, and sulfur dioxide included in the regenerated gas 53 reacts with the $CaCO_3$ slurry 55 and is fixed as $CaSO_4$. A part of the $CaCO_3$ slurry 55 including $CaSO_4$ is exhausted from the desulfurization equipment 44 to a dehydrator 45, and is separated into $CaSO_4$ 57 and water 58. On the other hand, exhaust gas 60 after being removed of sulfur dioxide is released via a stack to the atmosphere.

At the outlets of the catalytic adsorbers 46 and 47, $H_2S$ concentration in the purified $CO_2$ gas 54 is always monitored. If the $H_2S$ concentration exceeds a predetermined level, the valves 61, 64, 66 and 67 are opened and the valves 62, 63, 65 and 68 are closed, and the stripped gas 51 is introduced to the catalytic adsorber 47. By repeating this operation, the $H_2S$ concentration in the purified $CO_2$ gas 54 to be recovered is always maintained in a predetermined range.

As has been explained above, according to the present invention, at the time when removing $H_2S$ by means of adsorption, $H_2S$ can be surely removed to an extremely low concentration. Further, not only the adsorbent is recoverable, since the sulfur component is converted to sulfur dioxide during recovery, but also an advantage is obtained that a combustor for combusting $H_2S$ and converting sulfur into sulfur dioxide and a mist separator for removing sulfur trioxide mist, which are conventionally required, are unnecessary.

As the adsorbent filled in the catalytic adsorbers 46 and 47, for example, an adsorbent including at least oxides of titanium and molybdenum can be used. As the temperature of contacting the regenerated gas 53 with the adsorbent, 100 to 300° C. is preferable, although the temperature is not limited to this range. As the regenerating temperature of the adsorbent, 100 to 600° C. is preferable, although the temperature is not limited to this range. Air alone can be used for the regeneration of the adsorbent, although the mixture gas of air and the regenerated gas are used in the present embodiment.

In the present embodiment, the oxidation device of $H_2S$ is combined with the removing device shown in the first embodiment. However, the oxidation device of $H_2S$ can be combined with the removing device shown in other embodiments.

Fourth Embodiment

Figure 4:
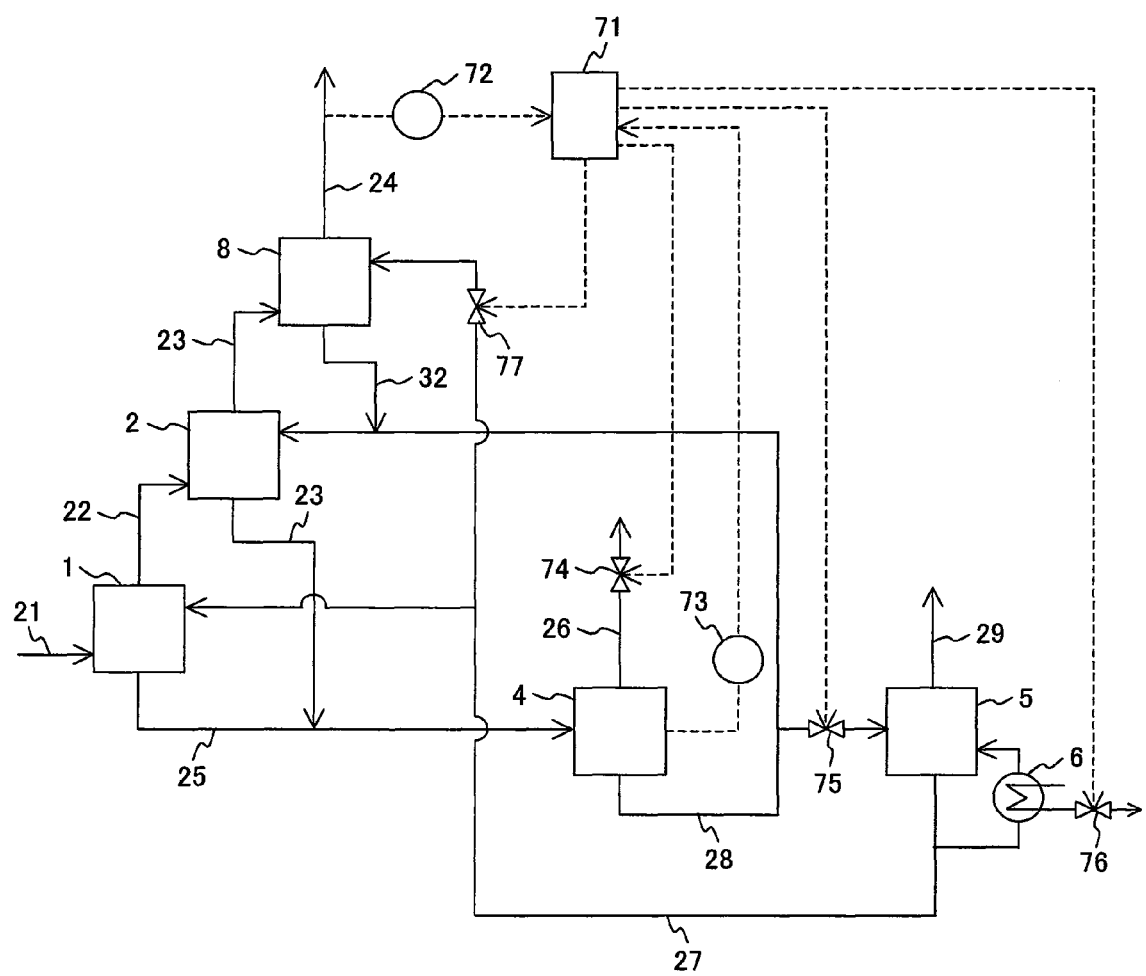
FIG. 4 is a block diagram showing an example of a control method for a system according to the second embodiment of the present invention.

A fourth embodiment of the present invention will be explained with reference to FIG. 4. The present embodiment shows an example that relates to a control method for the system shown in the second embodiment (FIG. 2). In the present embodiment, an example of a method of controlling the $H_2S$ concentration will be explained. FIG. 4 is a block diagram showing the system control method according to the present embodiment.

With regard to the purified gas 24, $H_2S$ concentration is measured with an $H_2S$ analyzer 72 and the measured value thereof is input to a controller 71. In the controller 71, a managed concentration is registered in advance, and a circuit is designed in such a manner that when the concentration measured by the $H_2S$ analyzer 72 exceeds the managed concentration, a valve 77 is opened. When the opening degree of the valve 77 increases, an amount of lean solution to be introduced into the secondary absorber 8 is increased and liquid/gas ratio rises, thereby, $H_2S$ concentration in the treated gas can be decreased.

Further, while monitoring the pressure in the flash drum 4 with a pressure gauge 73, a valve 74 may be opened. With this operation, the pressure in the flash drum 4 decreases and a release amount of $H_2S$ increases, therefore, the $H_2S$ concentration in the semi-lean solution 28 decreases. In association thereto, the $H_2S$ concentration in the lean solution 27 also decreases. As a result, $H_2S$ concentration in the treated gas can be decreased.

Other than the above methods, while increasing the opening degree of a valve 75, the amount of the semi-lean solution 28 to be introduced into the stripper 5 is increased, and at the same time while increasing the opening degree of a valve 76, the amount of steam to be supplied to the reboiler 6 can be increased. With this operation, since the amount of the lean solution 27 increases that is regenerated in further high level with respect to the amount of the semi-lean solution 28, thereby, $H_2S$ concentration in the purified gas 24 can be decreased.

The above three operations can be carried out in any order. Two or more of the operations can be carried out at the same time. In the present embodiment, the method for controlling the $H_2S$ concentration in the purified gas 24 is explained, although a control of the $CO_2$ concentration can be performed in the same method.

Fifth Embodiment

Figure 5:
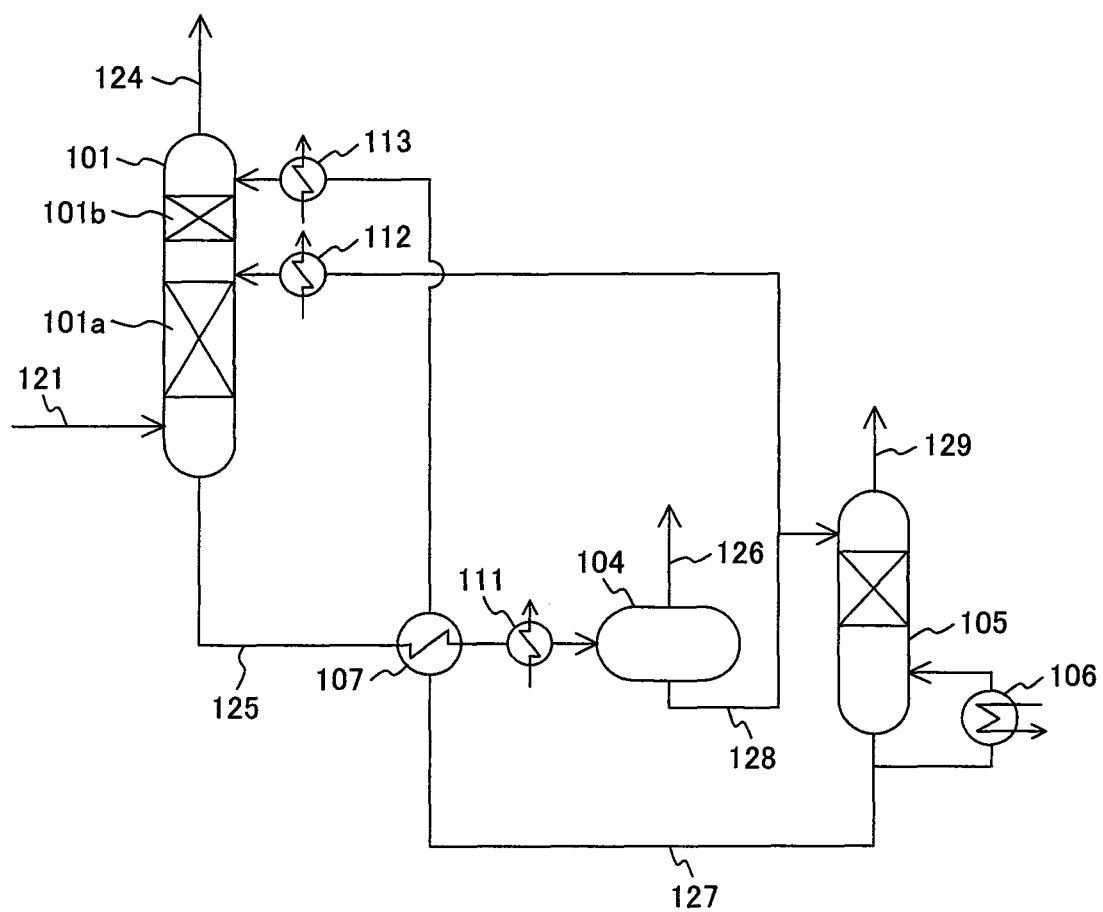
FIG. 5 is a block diagram showing a device for removing acidic materials according to a fifth embodiment of the present invention.

A fifth embodiment of the present invention will be explained with reference to FIG. 5. FIG. 5 is a block diagram of a device for removing acidic materials in the present embodiment. The present embodiment shows an example that is applied to a purifying installation for natural gas.

Feed gas 121, to which necessary preprocessing and temperature adjustment have been effected beforehand, is supplied to a absorber (second absorber) 101 from a bottom of a first contacting layer 101a in the absorber 101. The feed gas 121 contacts in a manner of countercurrent with semi-lean solution 128 supplied from a top of the first contacting layer 101a, and a part of acidic materials, such as $CO_2$ and $H_2S$, included in the feed gas 121 is removed. In succession thereto, the feed gas is contacted in a manner of countercurrent in a secondary contacting layer 101b with lean solution 127 supplied from a top of the secondary contacting layer 101b, and the acidic materials, such as $CO_2$ and $H_2S$, are further removed and purified gas 124 is obtained. On the other hand, rich solution 125 drained from a bottom of the absorber 101 is introduced to a lean/rich exchanger 107 and is heated by the lean solution 127. Because of having passed through the lean/rich exchanger 107, the temperature level of the rich solution 125 is raised by 10 to 50° C. higher than that when the rich solution 125 has been exhausted from an outlet of the absorber 101. Depending on necessity, the rich solution 125 is further heated in a rich solution heater 111. By means of heating of the rich solution 125, since a part of $CO_2$ included in the rich solution 125 is released, the rich solution 125 becomes as a whole in a state of mixed phases of gas and liquid. Such rich solution 125 in the state of mixed phases is introduced into a flash drum 104 in which the pressure is set lower than that in the absorber 101, and $CO_2$ and $H_2S$ are further released there. The released gas is separated herein from the rich solution and is exhausted as stripped gas 126. A part of the semi-lean solution 128 separated from the stripped gas 126 in the flash drum 104 is cooled in a first lean solution cooler 112 and thereafter is introduced into the primary absorber 101 from a top of the primary contacting layer 101a. The remaining part of the semi-lean solution 128 is introduced into a stripper 105 and is heated by a reboiler 106, and a substantial part of the remaining $CO_2$ and $H_2S$ is released and the lean solution 127 is obtained. A part of the lean solution 127 is cooled in the lean/rich exchanger 107 and in a second lean solution cooler 113 down to a predetermined temperature and is introduced into the absorber 101 from a top portion of the secondary contacting layer 101b.

Generally, since $H_2S$ concentration in treated gas is required to be reduced to an extremely lower order, such as down to a few ppm, it is necessary to contact the treated gas with lean solution including substantially no $H_2S$ near an outlet of the treated gas. For this reason, in the present embodiment, the lean solution regenerated in high level in the stripper 105 is supplied from the top of the absorber. However, when $H_2S$ in an order of ppm and $CO_2$ in an order of % coexist, since a large amount of lean solution has to be circulated for removing $CO_2$, a large amount of steam has to be supplied to the reboiler for regenerating the rich solution. On the other hand, in the present embodiment, since the semi-lean solution 128 is introduced from the top of the primary contacting layer 101a, a substantial part of $CO_2$ included in the feed gas 121 is removed, significantly reducing an amount of the lean solution to be supplied from the top of the secondary contacting layer 101b. This is because that since $CO_2$ concentration is high as in an order of %, $CO_2$ can be absorbed even in the semi-lean solution in which a certain degree of $CO_2$ remains in the solution. The $CO_2$ concentration in the semi-lean solution can be adjustable by varying the temperature and the pressure of the flash drum 104. If the $CO_2$ concentration in the semi-lean solution is desired to be reduced, the regeneration is accelerated by way of either the semi-lean solution is heated by the rich solution heater 111 or the pressure in the flash drum 104 is reduced. As has been explained hitherto, according to the present embodiment, since a substantial part of $CO_2$ is removed by the regenerated semi-lean solution without using steam, an amount of steam used in the reboiler 106 can be significantly reduced.

On the other hand, the composition of the stripped gas 126 affects the consumed energy in the post process. $CO_2$ separated from the feed gas is frequently stored in the ground or at the sea bottom after being compressed, except for being reused as in a form of gas. In the present embodiment, by optimizing the kind of rich solution or the temperature and pressure of the primary absorber and the flash drum, the stripped gas 126 having a high $CO_2$ concentration can be obtained. As a result, $CO_2$ having less mixture impurities can be obtained, leading to the elimination of an impurity removal at a post process or the laborsaving.

As has been explained above, by reducing the pressure in the flash drum 104, $CO_2$ concentration in the semi-lean solution can be reduced. However, on the other hand, since the pressure of the stripped gas 126 including of $CO_2$ released from the rich solution also reduces, if it is required to liquefy the stripped gas 126 in a post process, the power required for the compression process is increased. Accordingly, as shown in the present embodiment, when the rich solution being introduced into the flash drum 104 is heated by making use of the retaining heat in the lean solution 127 by using the lean/rich exchanger 107, the regeneration is accelerated and the $CO_2$ concentration in the semi-lean solution can be reduced and at the same time the power for compressing the stripped gas at the post process can be reduced.

Further, in the present embodiment, the lean solution and the semi-lean solution are cooled at a pre stage before they are introduced into the primary absorber 101. This is because of bringing the heated rich solution for regeneration to a temperature suitable for absorbing $CO_2$ and $H_2S$.

Sixth Embodiment

Figure 6:
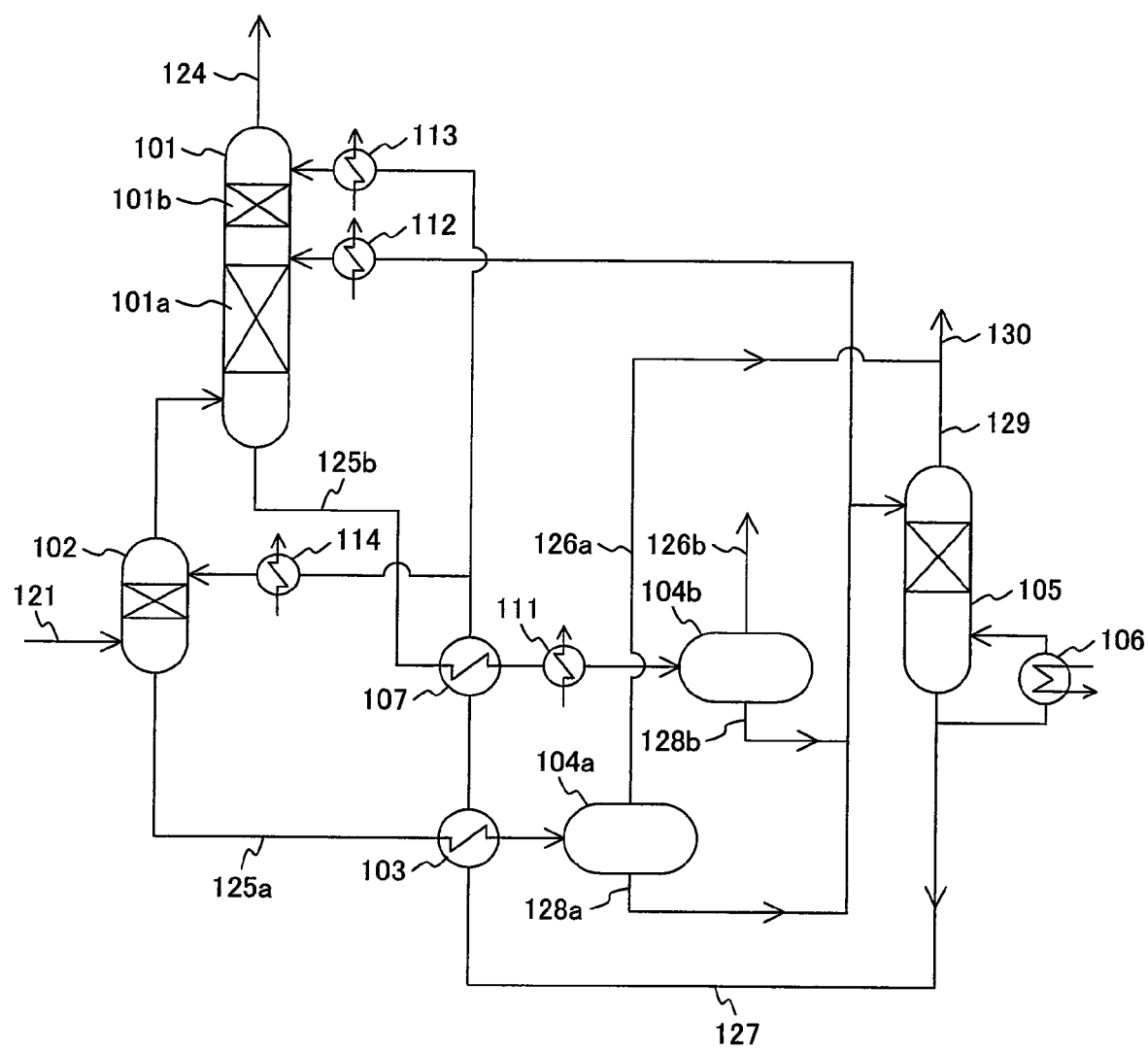
FIG. 6 is a block diagram showing a device for removing acidic materials according to a sixth embodiment of the present invention.

A sixth embodiment of the present invention will be explained with reference to FIG. 6. The present embodiment shows an example in which a pre-absorber (first absorber) 102 is additionally provided at a pre stage of the primary absorber 101 in the fifth embodiment. Only different portions from the fifth embodiment will be explained.

Feed gas 121, to which necessary preprocessing and temperature adjustment have been effected beforehand, is introduced into the pre-absorber 102, where the feed gas 121 is contacted in a manner of countercurrent with the lean solution 127, and a part of acidic materials, such as $CO_2$ and $H_2S$, included in the feed gas 121 is removed. In succession thereto, the feed gas 121 is introduced into the absorber 101 and is contacted in a manner of countercurrent with the semi-lean solution 128 in the primary contacting layer 101a and further with the lean solution 127 in the secondary contacting layer 101b, and the remaining acidic materials, such as $CO_2$ and $H_2S$, are removed and the treated gas 124 is obtained.

On the other hand, rich solution 125a having absorbed a part of acidic materials, such as $CO_2$ and $H_2S$, included in the feed gas 121 in the pre-absorber 102 is heated by the lean solution 127 in the lean/rich exchanger 103, and thereafter, introduced into a flash drum 104a. The pressure in the flash drum 104a is set lower than that in the pre-absorber 102, and a part of $CO_2$ and $H_2S$ is released from the rich solution 125a. The stripped gas 126a released from the rich solution 125a is separated herein from the rich solution, and $H_2S$ is removed in the post process together with stripped gas 129 released from the stripper 105. Depending on necessity, the rich solution 125a can be further heated at the post stage of the lean/rich exchanger 103.

The rich solution 125b having absorbed $CO_2$ and $H_2S$ remaining in the feed gas 121 in the primary absorber 101 is heated by the lean solution 127 in the lean/rich exchanger 107, and thereafter, further heated by the rich solution heater 111 and introduced into the flash drum 104b. The pressure in the flash drum 104b is set lower than that in the primary absorber 101, and a part of $CO_2$ and $H_2S$ is released from the rich solution 125b. The stripped gas 126b released from the rich solution 125b is separated herein from the rich solution.

The semi-lean solution, which includes remaining $CO_2$ in a comparatively high concentration, has a low capacity of absorbing $H_2S$ in an order of ppm. Contrary thereto, the lean solution, substantially including no $CO_2$, well absorbs $H_2S$ even in an order of ppm. By contacting the feed gas at first with the lean solution, $H_2S$ is efficiently removed beforehand. Thereafter, by introducing the feed gas into the primary absorber the $H_2S$ concentration in the stripped gas 126b can be reduced. In this manner, according to the present embodiment, even when $H_2S$ concentration in the feed gas 121 is comparatively high, the stripped gas 126b having a high purity of $CO_2$ can be recovered.

Seventh Embodiment

Figure 7:
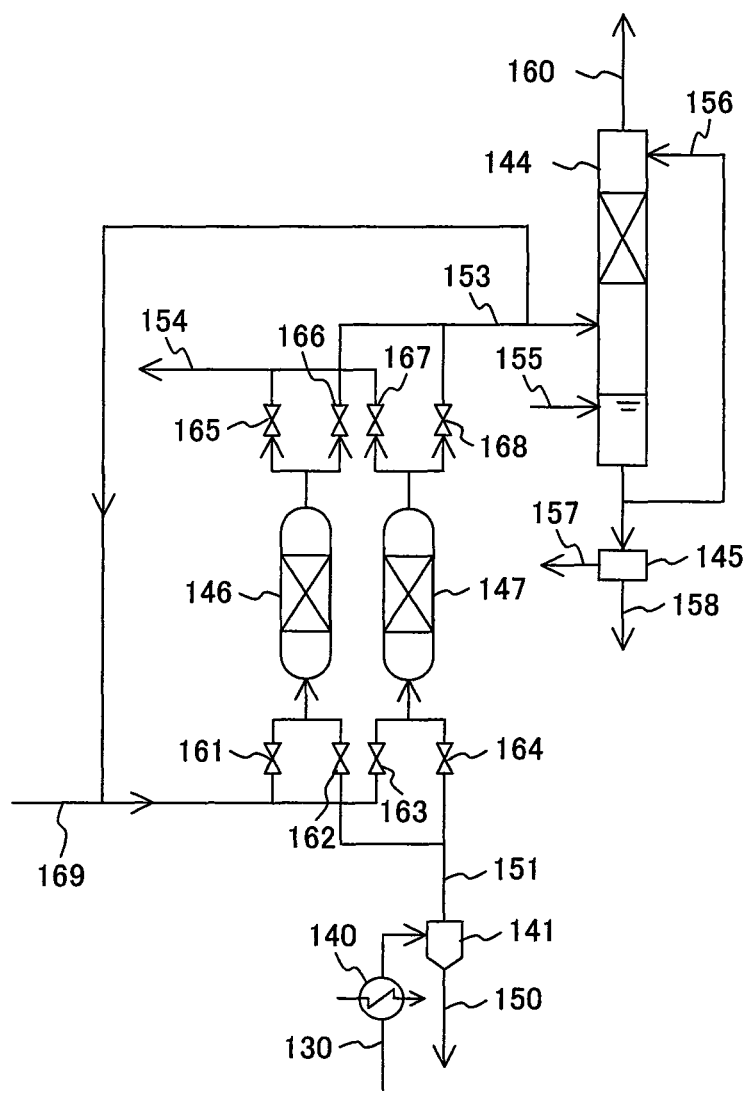
FIG. 7 is a block diagram showing a device for removing acidic materials according to a seventh embodiment of the present invention.

A seventh embodiment of the present invention will be explained with reference to FIG. 7. The present embodiment shows an example in which $H_2S$ included in the stripped gas 130 released from the rich solution in the flash drum and in the stripper is removed by making use of an adsorbent, and highly purified $CO_2$ is recovered.

After being cooled in a cooler 140, the stripped gas 130 including $CO_2$ and $H_2S$ is introduced into a knock-out drum 141 where water 150 included in the stripped gas 130 is removed. Stripped gas 151 of which water concentration is reduced is introduced through a valve 162 into a catalytic adsorber 146. In the catalytic adsorber 146, an adsorbent is filled. Accordingly, $H_2S$ included in the stripped gas 151 is adsorbed in the catalytic adsorber 146, and purified $CO_2$ gas 154 including substantially no $H_2S$ is obtained through a valve 165. At this time, valves 161,164, 166 and 167 are closed. The same adsorbent is also filled in another catalytic adsorber 147. When the valves 164 and 167 are opened, the stripped gas 151 can be introduced into the catalytic adsorber 147.

The adsorbent has features to adsorb $H_2S$ at a low temperature of 100 to 300° C., and thereafter, to convert the adsorbed sulfur into sulfur dioxide when gas including oxygen is supplied under a temperature of 100 to 600° C., regenerating itself (For example, see Japanese Patent Application Laid-Open Publication No. 52-114589 and No. 52-114590).

Now, a regenerating operation of the adsorbent will be explained. Herein, a regenerating operation of the adsorbent provided in the catalytic adsorber 147 will be explained. To the catalytic adsorber 147, gas of which oxygen concentration is adjusted to a predetermined level by mixing a part of regenerated gas 153 with air 169 heated beforehand to a predetermined temperature is supplied via a valve 163. The gas, which includes oxygen, oxidizes a sulfur component adsorbed in the adsorbent and converts the sulfur component to sulfur dioxide, regenerating the adsorbent. The regenerated gas 153 is exhausted via a valve 168 from the catalytic adsorber 147. A part of the regenerated gas 153 is mixed with air 169 as has been explained above and is supplied via the valve 163 to the catalytic adsorber 147 performing regeneration. The remaining part of the regenerated gas 153 is introduced into desulfurization equipment 144. In the desulfurization equipment (gypsum recovering equipment) 144, $CaCO_3$ slurry 155 is circulated, and sulfur dioxide included in the regenerated gas 153 reacts with the $CaCO_3$ slurry 155 to be fixed as $CaSO_4$. A part of the $CaCO_3$ slurry 155 including $CaSO_4$ is exhausted from the desulfurization equipment 144 to a dehydrator 145, and is separated into $CaSO_4$ 157 and water 158. On the other hand, exhaust gas 160 from which sulfur dioxide has been removed is released via a stack to the atmosphere.

H$_2$S concentration in the purified CO$_2$ gas 154 is always monitored. When the H$_2$S concentration exceeds a predetermined level, the stripped gas 151 is introduced into the catalytic adsorber where regeneration is completed by switching the valves. Through repeating this operation, the H$_2$S concentration in the purified CO$_2$ gas 154 to be recovered is always maintained in a predetermined range.

As the adsorbent used in the present embodiment, for example, an adsorbent including at least oxides of titanium and molybdenum can be used. As the temperature of contacting the regenerated gas 153 with the adsorbent, 100 to 300° C. is preferable, although the temperature is not limited to this range. As the regenerating temperature of the adsorbent, 100 to 600° C. is preferable, although the temperature is not limited to this range. In the present embodiment, the mixture gas of air and the regenerated gas is used for the regeneration of the adsorbent in order to control the temperature of the adsorbent in a predetermined temperature range during the regeneration. However, air alone may be used for the regeneration of the adsorbent.

Conventionally, stripped gas from a stripper is introduced into desulfurization equipment after the stripped gas is introduced into a combustor and H$_2$S is converted into sulfur dioxide. However, with this combustion method, CO$_2$ is released as combustion exhaust gas and can not be recovered. The present embodiment has an advantage that highly purified CO$_2$ can be recovered since only H$_2$S can be removed from the stripped gas. When the H$_2$S concentration is low and the CO$_2$ concentration is high in stripped gas, the conventional combustion method has a disadvantage that a large amount of fuel has to be used for heating CO$_2$ with a large specific heat to a high temperature. Contrary thereto, the adsorbing method shown in the present embodiment can greatly reduce the cost for processing the stripped gas since no fuel is used.

Eighth Embodiment

Figure 8:
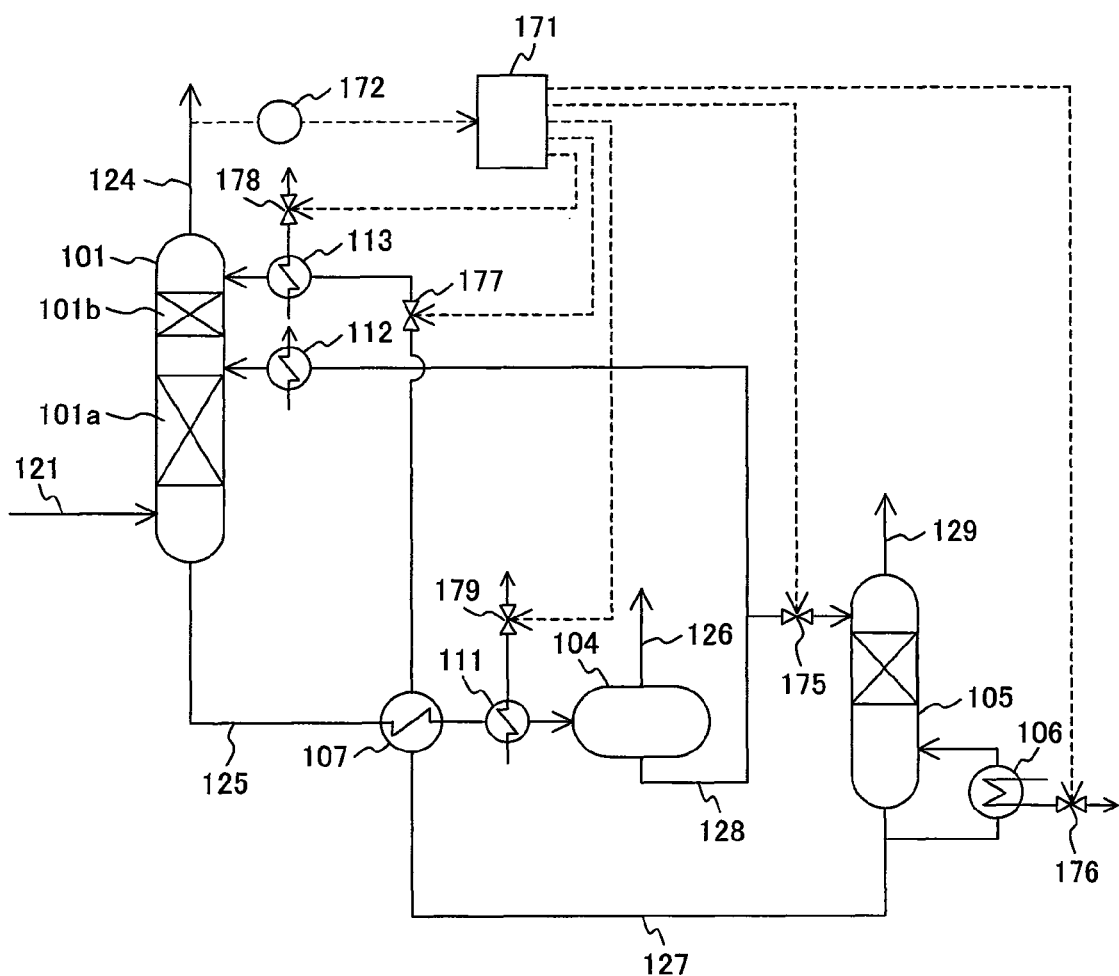
FIG. 8 is a block diagram showing an example of a control method for a system according to the fifth embodiment of the present invention.
Figure 9:
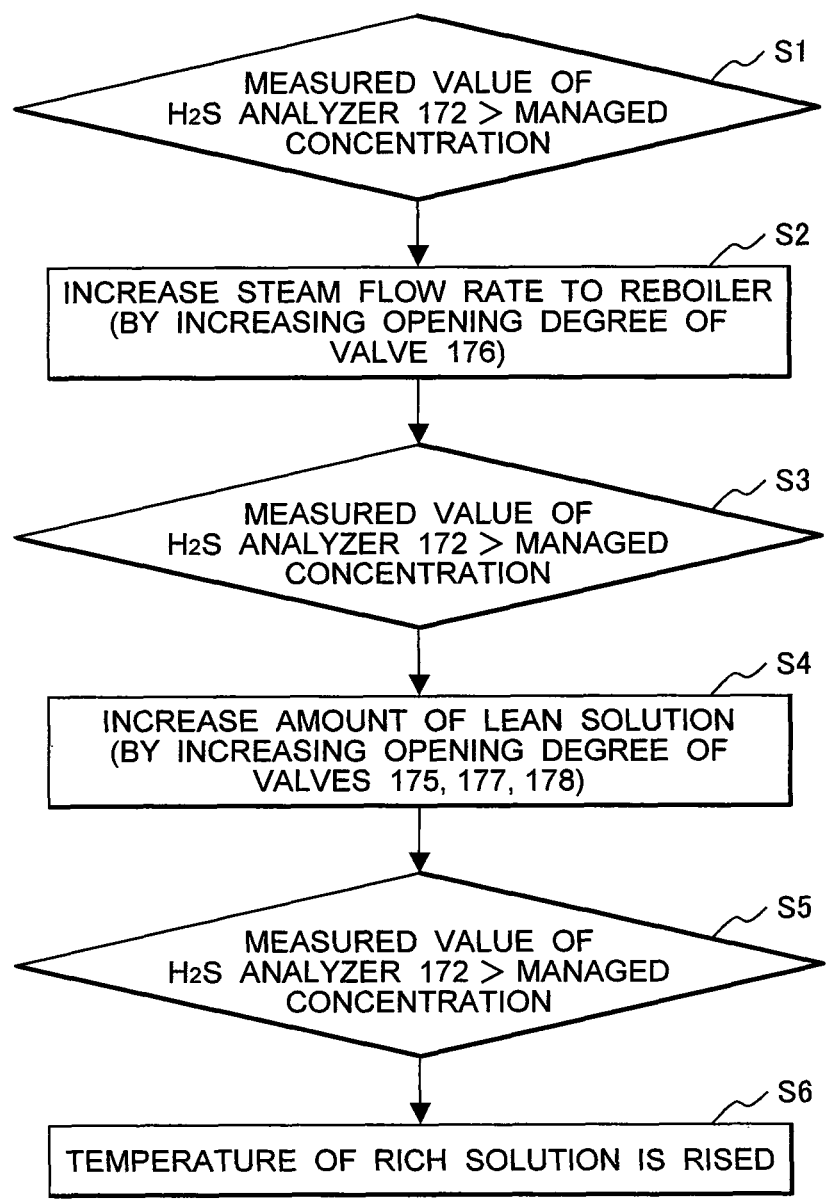
FIG. 9 is a flowchart showing an example of a control method for a system according to the fifth embodiment of the present invention.

Eighth embodiment of the present invention will be explained with reference to FIGS. 8 and 9. The present embodiment is an example that relates to a control method for the system shown in the fifth embodiment (FIG. 5). In the present embodiment, an example of a method for controlling the H$_2$S concentration in the treated gas 124 will be explained. FIG. 8 is a block diagram showing the system control method according to the present embodiment, and FIG. 9 is a flowchart of the control method.

An H$_2$S analyzer 172 measures H$_2$S concentration in the purified gas 124, and the measured value is input to a controller 171. In the controller 171, a managed concentration is set in advance. If the concentration measured by the H$_2$S analyzer 172 exceeds the managed concentration (step S1), the controller 171 at first increases the opening degree of a valve 176, and then increases a flow rate of steam supplied to the reboiler 106 to accelerate the regeneration of the rich solution (step S2). As a result, since the H$_2$S concentration in the lean solution 127 decreases, the H$_2$S concentration in the treated gas can be reduced.

In spite of the operation as explained above, if H$_2$S concentration still exceeds the managed concentration (step S3), the opening degree of a valve 175 is enlarged and rate of the semi-lean solution 128 to be introduced into the stripper 105 is increased. At the same time, the opening degree of a valve 177 is enlarged and an amount of the lean solution to be introduced into the primary absorber 101 is increased. Further, at the same time with the above operation, the opening degree of a valve 178 is increased and an amount of cooling water to be introduced into the second lean solution cooler 113 is increased (step S4).

Even in spite of the operation as explained above, if H$_2$S concentration still exceeds the managed concentration (step S5), a method can be used where, by increasing the opening degree of a valve 179 that adjusts a flow rate of steam to be introduced into the rich solution heater 111, the temperature of the rich solution is raised (step S6) to accelerate the regeneration.

When a flow rate of the lean solution with respect to the semi lean solution to be introduced into the primary absorber 101 is increased, an average loading of the rich solution reduces. More specifically, by opening the valve 177, the flow rate of the lean solution 127 to be introduced into the primary absorber 101 is increased. Thereby, liquid/gas ratio in the primary absorber 101 rises, and the H$_2$S concentration in the treated gas can be decreased.

The above operations are basically performed in the order as explained, although the order can be changed. Two or more of the operations can be carried out at the same time. In the present embodiment, the method for controlling the H$_2$S concentration in the treated gas 124 is explained, although a control of the CO$_2$ concentration can be performed in the same method.

What is claimed is:

1. A method for removing CO$_2$ and H$_2$S from a feed gas including at least CO$_2$ and H$_2$S, comprising:
 a step of introducing the feed gas into a first absorber, and removing CO$_2$ and H$_2$S from the feed gas by contacting the feed gas with a lean solution in the first absorber; and
 a step of subsequently introducing the feed gas into a second absorber, and further removing CO$_2$ and H$_2$S remaining in the feed gas by contacting the feed gas with a semi-lean solution in the second absorber;
 wherein a rich solution composed of the lean solution and the semi-lean solution that have absorbed CO$_2$ and H$_2$S in the first absorber and in the second absorber respectively is introduced into a flash drum in which an internal pressure is kept lower than that in the first absorber and in the second absorber; after a part of CO$_2$ and H$_2$S is released from the rich solution and a semi-lean solution is obtained in the flash drum, a part of the semi-lean solution in the flash drum is cooled and introduced into the second absorber to contact again with the feed gas in the second absorber; a remaining part of the semi-lean solution in the flash drum is introduced into a stripper and heated to release remaining CO$_2$ and H$_2$S from the semi-lean solution and a lean solution is obtained in the stripper; a part of the lean solution in the stripper is cooled and introduced into the first absorber to contact again with the feed gas in the first absorber; and after a remaining part of the lean solution in the stripper is cooled, the remaining part of the lean solution is introduced into the second absorber at a level above a level where the semi-lean solution from which a part of CO$_2$ and H$_2$S has been released in the flash drum is introduced, and again is contacted with the feed gas in the second absorber, and thereby obtaining treated gas, and
 wherein CO$_2$ concentration and H$_2$S concentration in the treated gas are measured; and if the measured CO$_2$ concentration or H$_2$S concentration in the treated gas exceeds a predetermined concentration, an amount of the semi-lean solution to be introduced from the flash drum into the stripper is increased and at the same time an amount of steam to be introduced into a reboiler in the stripper is increased to thereby increase a rate of regeneration of the rich solution.

2. A method for removing $CO_2$ and $H_2S$ from a feed gas including at least $CO_2$ and $H_2S$, comprising:
- a step of introducing the feed gas into a first absorber, and removing $CO_2$ and $H_2S$ from the feed gas by contacting the feed gas with a lean solution in the first absorber; and
- a step of subsequently introducing the feed gas into a second absorber, and further removing $CO_2$ and $H_2S$ remaining in the feed gas by contacting the feed gas with a semi-lean solution in the second absorber;
- wherein a rich solution composed of the lean solution and the semi-lean solution that have absorbed $CO_2$ and $H_2S$ in the first absorber and in the second absorber respectively is introduced into a flash drum in which an internal pressure is kept lower than that in the first absorber and in the second absorber; after a part of $CO_2$ and $H_2S$ is released from the rich solution and a semi-lean solution is obtained in the flash drum, a part of the semi-lean solution in the flash drum is cooled and introduced into the second absorber to contact again with the feed gas in the second absorber; a remaining part of the semi-lean solution in the flash drum is introduced into a stripper and heated to release remaining $CO_2$ and $H_2S$ from the semi-lean solution and a lean solution is obtained in the stripper; a part of the lean solution in the stripper is cooled and introduced into the first absorber to contact again with the feed gas in the first absorber; and after a remaining part of the lean solution in the stripper is cooled, the remaining part of the lean solution is introduced into the second absorber at a level above a level where the semi-lean solution from which a part of $CO_2$ and $H_2S$ has been released in the flash drum is introduced, and again is contacted with the feed gas in the second absorber, and thereby obtaining treated gas, and wherein $CO_2$ concentration and $H_2S$ concentration in the treated gas are measured, and if the measured $CO_2$ concentration or $H_2S$ concentration in the treated gas exceeds a predetermined concentration, the releasing of $CO_2$ and $H_2S$ from the rich solution is accelerated by reducing the pressure in the flash drum to thereby lower the concentration of $CO_2$ and $H_2S$ in the rich solution.

* * * * *